United States Patent [19]
Mohajerani et al.

[11] Patent Number: 6,052,251
[45] Date of Patent: Apr. 18, 2000

[54] ACTUATOR ARM INTEGRATED PIEZOELECTRIC MICROACTUATOR

[75] Inventors: Khosrow Mohajerani, Newbury Park; Joseph M. Sampietro, Tarzana; Anoush M. Fard, Agoura Hills; Jeffrey G. Barina, Somis; Muhammad A. Hawwa, Simi Valley; LeRoy A. Volz, Northridge; Tien Q. Le, Camarillo; Daniel R. Vigil, Agoura Hills, all of Calif.

[73] Assignee: Seagate Technology, Inc., Scotts Valley, Calif.

[21] Appl. No.: 08/836,292

[22] PCT Filed: May 12, 1997

[86] PCT No.: PCT/US97/07892

§ 371 Date: Mar. 19, 1998

§ 102(e) Date: Mar. 19, 1998

[87] PCT Pub. No.: WO97/32044

PCT Pub. Date: Sep. 4, 1997

Related U.S. Application Data

[60] Provisional application No. 60/030,406, Nov. 1, 1996.

[51] Int. Cl.[7] .................................................. G11B 5/55
[52] U.S. Cl. ........................ 360/78.05; 360/109
[58] Field of Search .................. 360/78.05, 75, 360/109

[56] References Cited

U.S. PATENT DOCUMENTS

| | | | |
|---|---|---|---|
| 3,924,268 | 12/1975 | McIntosh et al. | 360/78.05 |
| 4,605,977 | 8/1986 | Matthews et al. . | |
| 4,620,251 | 10/1986 | Gitzendanner . | |
| 4,651,242 | 3/1987 | Hirano et al. . | |
| 4,853,810 | 8/1989 | Pohl et al. . | |
| 4,914,725 | 4/1990 | Belser et al. | 360/78.05 X |
| 4,962,391 | 10/1990 | Kitahara et al. . | |
| 5,021,906 | 6/1991 | Chang et al. . | |
| 5,034,828 | 7/1991 | Anath et al. . | |
| 5,065,268 | 11/1991 | Hagen . | |
| 5,072,240 | 12/1991 | Miyazawa et al. . | |
| 5,079,659 | 1/1992 | Hagen . | |
| 5,105,408 | 4/1992 | Lee et al. . | |
| 5,177,652 | 1/1993 | Yamaguchi et al. | 360/78.05 |
| 5,189,578 | 2/1993 | Mori et al. | 360/78.05 X |
| 5,255,106 | 10/1993 | Usui et al. . | |
| 5,276,573 | 1/1994 | Harada et al. . | |
| 5,552,809 | 9/1996 | Hosono et al. . | |
| 5,623,461 | 4/1997 | Sohmuta | 360/78.05 X |
| 5,657,188 | 8/1997 | Jurgenson et al. . | |

FOREIGN PATENT DOCUMENTS

| | | | |
|---|---|---|---|
| 63-122069 | 5/1988 | Japan | 360/78.05 |
| 2-263369 | 10/1990 | Japan | 360/78.05 |
| 3-69073 | 3/1991 | Japan | 360/78.05 |
| 4-134681 | 5/1992 | Japan | 360/78.05 |
| 4-368676 | 12/1992 | Japan | 360/78.05 |
| 6-20412 | 1/1994 | Japan | 360/78.05 |

OTHER PUBLICATIONS

"Silicon Micromachined Electromagnetic Microactuators for Rigid Disk Drives" by Tang et al, *IEEE Transactions on Magnetics*, vol. 31, No. 6, Nov. 1995.

(List continued on next page.)

*Primary Examiner*—Aristotelis M. Psitos
*Assistant Examiner*—James L Habermehl
*Attorney, Agent, or Firm*—Kinney & Lange, P.A.

[57] ABSTRACT

A system for positioning a transducing head in a disc drive device over a selected track of a rotatable disc includes an actuator arm which is rotatable about an axis, a head suspension mechanism connected to the actuator arm, and a slider carrying a transducing head and supported by the head suspension mechanism. A low resolution motor moves the actuator arm about the axis to effect coarse movement of the head between tracks of the disc. A piezoelectric element is embedded in the actuator arm to distort the arm to effect fine positioning of the head. Control circuitry distributes electrical signals to the low resolution motor and the piezoelectric element to selectively control movement thereof. The piezoelectric element is embedded in the actuator arm by removing a predetermined amount of material from the actuator arm and bonding the piezoelectric element in the resulting space it the actuator arm.

16 Claims, 7 Drawing Sheets

OTHER PUBLICATIONS

"Magnetic Recordings Head Positioning at Very High Track Densities Using a Microactuator–Based, Two–Stage Servo System" by Fan et al., *IEEE Transactions on Industrial Electronics*, vol. 42, No. 3, Jun. 1995.

"A Flexural Piggyback Milli–Actuator for Over 5 Gbit/in$^2$ Density Magnetic Recording" by Koganezawa et al, *IEEE Transactions on Magnetics*, vol. 32, No. 5, Sep. 1996.

"Transverse Mode Electrostatic Microactuator for MEMS–Based HDD Slider" by Imamura et al, *IEEE* 1996.

"An Experiment for Head Positioning System Using Sub-micron Track–width GMR Head" by Yoshikawa et al., *IEEE Transactions on Magnetics*, vol. 32, No. 5, Sep. 1996.

"Micro Electrostatic Actuators in Dual–Stage Disk Drives with High Track Density" by Tang et al., *IEEE Transactions on Magnetics*, vol. 32, No. 5, pp. 119–125.

"Piezoelectric Microactuator Compensating for Off–Track Errors in Magnetic Disk Drives" by Imamura et al, *Advance Information Storage Systems*, vol. 5, pp. 119–125.

"A Dual–Stage Magnetic Disk Drive Actuator Using A Piezoelectric Device for a High Track Density" by Mori et al., *IEEE Transactions on Magnetics*, vol. 27, No. 6, Nov. 1991.

"Dynamic Loading Criteria for 3–1/2 Inch Inline HDD Using Multilayer Piezoelectric Load/Unload Mechanism" by Kajitani et al., *IEEE Transactions on Magnetics*, vol. 27, No. 6, Nov. 1991.

ACTUATOR ARM INTEGRATED PIEZOELECTRIC MICROACTUATOR

This application claims benefit of provisional application 60/030,406 Nov. 1, 1996.

BACKGROUND OF THE INVENTION

The present invention relates to a mechanism for positioning a transducing head in a disc drive system, and more particularly relates to a piezoelectric microactuator integrated into an actuator arm of a disc drive system to provide high resolution head positioning over a selected track of a rotatable disc.

Concentric data tracks of information are being recorded on discs with increasing track densities, which reduces the margin for error in positioning a transducing head over a selected track due to the reduced radial distance between tracks and the narrow radial width of the tracks themselves. Typical actuator motors lack sufficient resolution to accurately position a head in a system implementing a disc with a high track recording density.

Various proposals have been made to provide a second, high resolution motor, or microactuator, to finely position a head at a radial position over a track, in addition to the low resolution actuator motor. These "dual-stage actuation" systems have taken a variety of forms. Some of the proposed designs would install a microactuator in the head slider itself. These designs require significant changes in the manufacturing of head sliders. A solution that allows existing mass manufacturing techniques for sliders to be used would be more desirable. Other proposed designs would replace a conventional gimbal with a specially designed silicon gimbal having a microactuator formed directly on the gimbal itself. Again, these designs require news complex gimbal manufacturing techniques, which are less efficient than a solution that utilizes existing disc drive components. Still other proposed designs would mount a microactuator motor where the actuator arm meets the head suspension. While these designs often require only minimal changes in the actuator arm head suspension designs, the connection between the actuator arm and the head suspension must be carefully designed to include the microactuator motor. In addition, none of the proposed designs includes a microactuator having the capability of sensing a position of the head slider based on a state of the microactuator. A solution with this capability, that requires minimal additional design steps to conventional actuator assembly design, would be a significant improvement over the presently proposed dual-stage actuation systems.

The present invention is directed to a piezoelectric microactuator embedded in the actuator arm of a disc drive system. U.S. Pat. No. 4,814,908 to Schmitz discloses a system for radially positioning a transducing head over the center of a track on a rotatable disc by placing a thermal element on one side of the actuator arm. The arm is made of a material which expands upon heating and contracts upon cooling, so that the arm can be expanded or contracted (thereby radially moving the transducing head carried by the arm) in response to controlled heating or cooling of the thermal element. However, the thermal element has a relatively slow response time, making it inadequate for some high performance disc drive systems. Also, expansion of the thermal element in response to a given input stimulus is not sufficiently precise and predictable to serve as an effective high resolution positioning mechanism. The introduction of heat into the actuator arm affects the environmental conditions of the disc drive, which can have significant effects on the operation of the positioning system. Finally, the current state of a thermal element cannot be readily detected, making it difficult to determine the appropriate input stimulus to effect incremental transformation of the microactuator to precisely position the head over a selected track.

SUMMARY OF THE INVENTION

A system is provided by the present invention to position a transducing head in a disc drive device over a selected track of a rotatable disc having a plurality of concentric tracks. The disc drive device includes an actuator arm rotatable about an axis to move a slider carrying a transducing head mounted by a head suspension mechanism to the actuator arm. A low resolution motor moves the actuator arm about the axis to effect coarse movement of the head on the slider between tracks of the rotatable disc. A piezoelectric element is embedded in the actuator arm to distort the arm to effect fine positioning of the head on the slider. Control circuitry distributes electrical signals to selectively operate the low resolution motor and the piezoelectric element.

According to an optional feature of the present invention, the control circuitry includes an input circuit providing a track number corresponding to the selected track, and a feedback loop including a summing circuit comparing the selected track number and a current track number to determine the desired movement of the head, a piezoelectric element controller for operating the piezoelectric element to effect fine movement of the head and distributing the control signals representative of a number of tracks remaining to be traversed, and a low resolution motor controller receiving the control signals from the piezoelectric element controller and operating the low resolution motor in response to the control signals to effect coarse movement of the head.

One aspect of the present invention encompasses a method of manufacturing an actuator arm. A predetermined amount of material is removed from a side portion of the actuator arm to create a space in the actuator arm. A piezoelectric element is bonded into the space in the actuator arm.

DETAILED DESCRIPTION OF THE PREFERRED EMBODIMENTS

Figure 1:
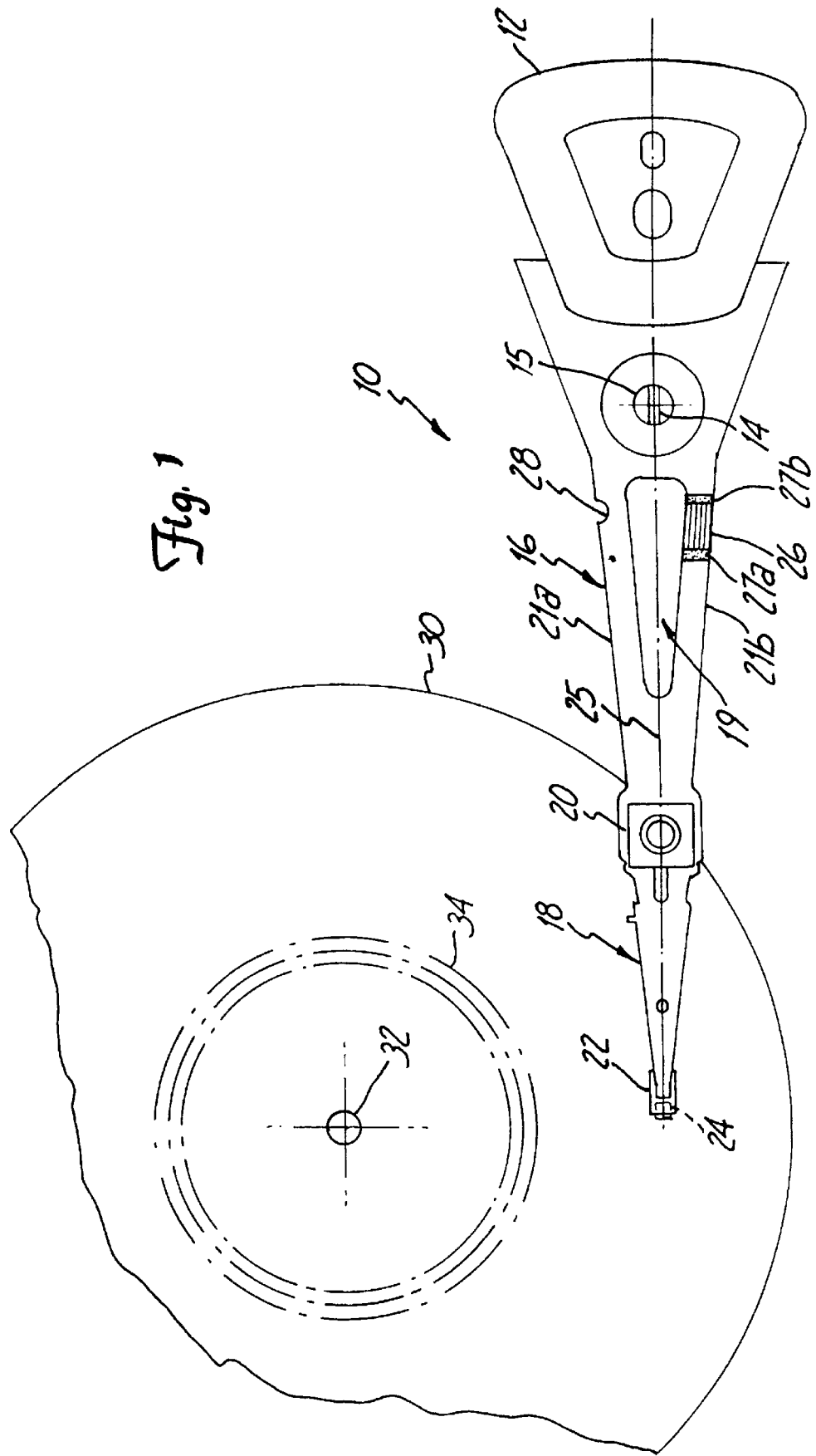
FIG. 1 is a top view of a dual-stage actuation system utilizing a piezoelectric element embedded in the actuator arm according to the present invention.
Figure 2:
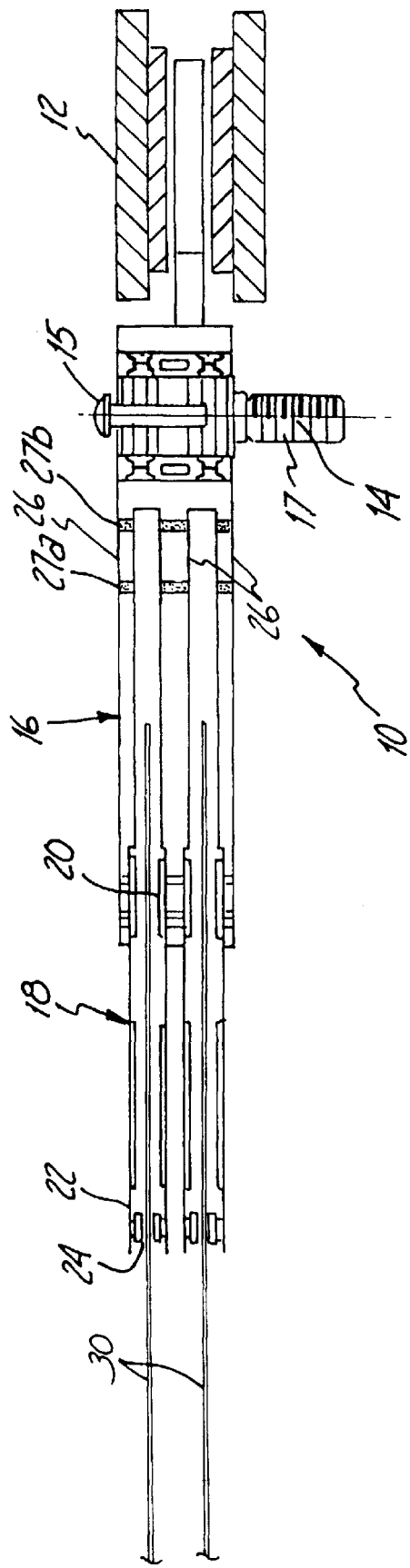
FIG. 2 is a side view of the dual-stage actuation system of FIG. 1.

FIG. 1 is a top view, and FIG. 2 is a side view, of a dual-stage actuation system 10 according to the present invention. Actuation system 10 includes a voice coil motor 12 operable to rotate actuator arms 16 of an E-block about axis 14 of shaft 17. Screw 15 fastens the top of actuator shaft 17 to a top cover (not shown). Head suspension 18 is connected to a distal end of actuator arm 16 by head suspension mounting block 20. Gimbal 22 is attached to a distal end of head suspension 18. Slider 24 is mounted to gimbal 22 in a manner known in the art. Voice coil motor 12 is a low resolution motor for coarse positioning of actuator arms 16 of the E-block. Voice coil motor 12 is operatively attached to actuator arm 16. Actuator arm 16 is rotatable around axis 14 in response to operation of voice coil motor 12, and has a longitudinal axis 25 normal to axis 14. Actuator arm 16 includes a space 19 forming arm side portions 21a and 21b on each side of longitudinal axis 25. Voice coil motor 12, actuator arm 16, head suspension 18, head suspension mounting block 20, gimbal 22, and slider 24 are all standard disc drive system components, manufactured in a manner known in the art.

Piezoelectric element 26 is embedded in side portion 21b of actuator arm 16, and expands and contracts in response to a voltage applied to its terminals 27a and 27b. The size of piezoelectric element 26 is varied in proportion to the voltage across its terminals 27a and 27b. Relief 28 is provided in side portion 21a of actuator arm 16, to reduce the force required to distort actuator arm 16 by selective expansion and contraction of piezoelectric element 26.

In operation, voice coil motor 12 is, operated to rotate actuator arm 16 around axis 14 to effect coarse positioning of slider 24 over a selected region of a rotatable disc 30. Disc 30 rotates around disc axis 32, and includes a plurality of concentric tracks 34 radially positioned around disc axis 32. Once coarse positioning has been achieved, a voltage is applied to piezoelectric element 26 to cause selective expansion or contraction of the piezoelectric element, thereby causing distortion of actuator arm 16 to effect fine positioning of slider 24 over a selected track of rotatable disc 30.

Piezoelectric element 26 is preferably positioned as near to rotational axis 14 of actuator arm 16 as possible, and as near to longitudinal axis 25 of actuator arm 16 as possible, so that the arc of fine positioning of slider 24 by expansion and contraction of piezoelectric element 26 approximates the designed head positioning arc as nearly as possibly, thereby minimizing head skew and maximizing the displacement of slider 24 for a corresponding expansion or contraction of piezoelectric element 26. Although many locations of piezoelectric element 26 along the length of actuator arm 16 are effective, piezoelectric element 26 is located within 20% of the length of actuator arm 16 from axis 14 ("near" axis 14) in a preferred embodiment of the invention, to achieve maximum amplification of expansion and contraction of piezoelectric element 26, minimize head skew, and minimally affect the balance and inertia of actuator arm 16. To assure distortion close to axis 14, relief 28 is formed in side portion 21a as near as possible to axis 14 as well.

Because the voltage across the piezoelectric element 26 is directly proportional to the size of the element, a current state of piezoelectric element 26 is readily ascertainable. This enables the actuation system to easily determine the incremental displacement (and voltage) required to adjust the piezoelectric element to position the head over the selected track of the disc. More efficient fine positioning of the head can thereby be achieved.

Figure 3:
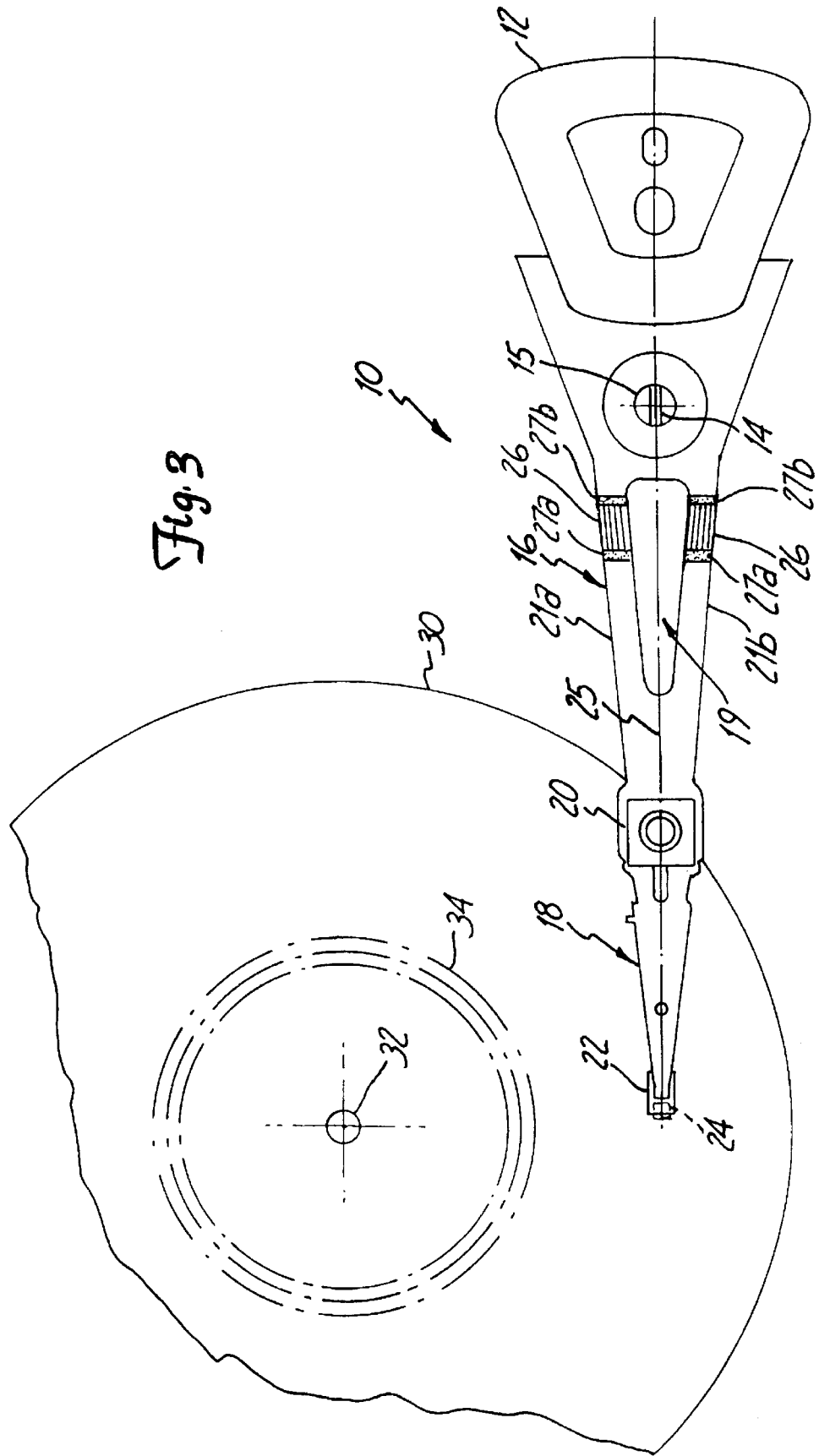
FIG. 3 is a top view of a dual-stage actuation system utilizing two piezoelectric elements embedded in opposite sides of the actuator arm in accordance with the present invention.
Figure 4:
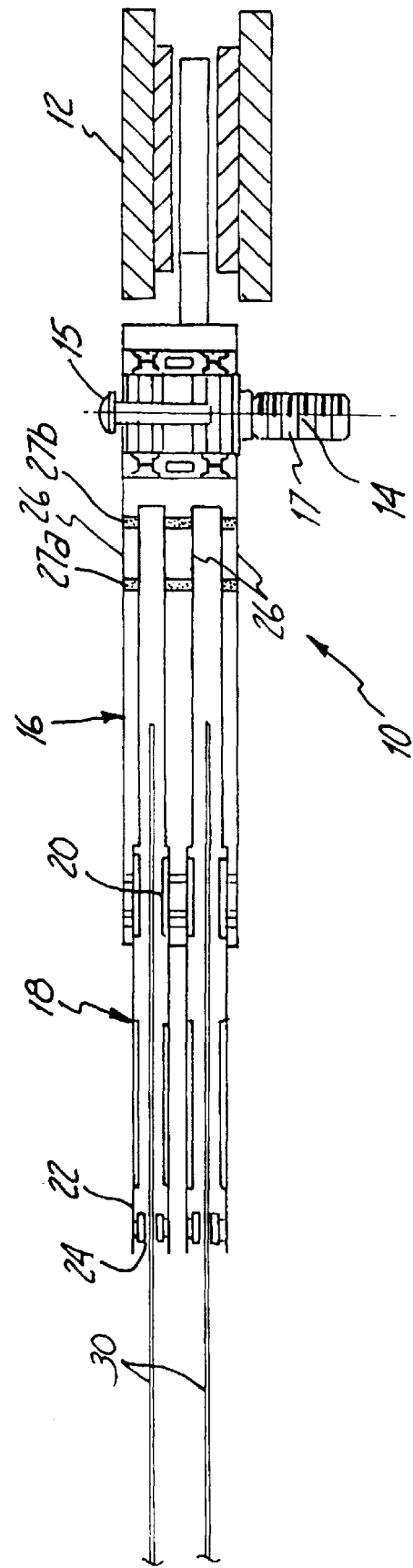
FIG. 4 is a side view of the dual-stage actuation system of FIG. 3.

FIG. 3 is a top view, and FIG. 4 is a side view, showing an alternative embodiment of the dual-stage actuation system 10 of the present invention. Actuation system 10 includes a voice coil motor 12 operable to rotate actuator arms 16 of an E-block about axis 14 of shaft 17. Screw 15 fastens the top of actuator shaft 17 to a top cover (not shown). Head suspension 18 is connected to a distal end of actuator arm 16 by head suspension mounting block 20. Gimbal 22 is attached to a distal end of head suspension 18. Slider 24 is mounted to gimbal 22 in a manner known in the art. Voice coil motor 12 is a low resolution motor for coarse positioning of actuator arms 16 of the E-block. Voice coil motor 12 is operatively attached to actuator arm 16. Actuator arm 16 is rotatable around axis 14 in response to operation of voice coil motor 12, and has a longitudinal axis 25 normal to axis 14. Actuator arm 16 includes a space 19 forming arm side portions 21a and 21b on each side of longitudinal axis 25. Voice coil motor 12, actuator arm 16, head suspension 18, head suspension mounting block 20, gimbal 22, and slider 24 are all standard disc drive system components, manufactured in a manner known in the art.

Piezoelectric elements 26 are embedded in side portions 21a and 21b. actuator arm 16, and are preferably implemented with opposite polarities, so that a voltage introduced across terminals 27a and 27b of both piezoelectric elements induces expansion of one side portion of actuator arm 16 and contraction of the other side portion of actuator arm 16. This complementary arrangement of piezoelectric elements 26 allows a greater distortion of actuator arm 16 to be achieved, thereby enabling greater displacement of slider 24. Piezoelectric elements 26 are preferably positioned as near to rotational axis 14 of actuator arm 16 as possible, and as near to longitudinal axis 25 of actuator arm 16 as possible, so that the arc of fine positioning of slider 24 by expansion and contraction of piezoelectric elements 26 approximates the designed head positioning arc as nearly as possibly, thereby minimizing head skew and maximizing the displacement of slider 24 for a corresponding expansion or contraction of piezoelectric elements 26. While many locations of piezoelectric elements 26 are effective, piezoelectric elements 26 are located within 20% of the length of the actuator arm from axis 14 ("near" axis 14) in a preferred embodiment of the invention, to maximize amplification of expansion and contraction of piezoelectric elements 26, minimize head skew, and minimally affect the balance and inertia of actuator arm 16.

Figure 5:
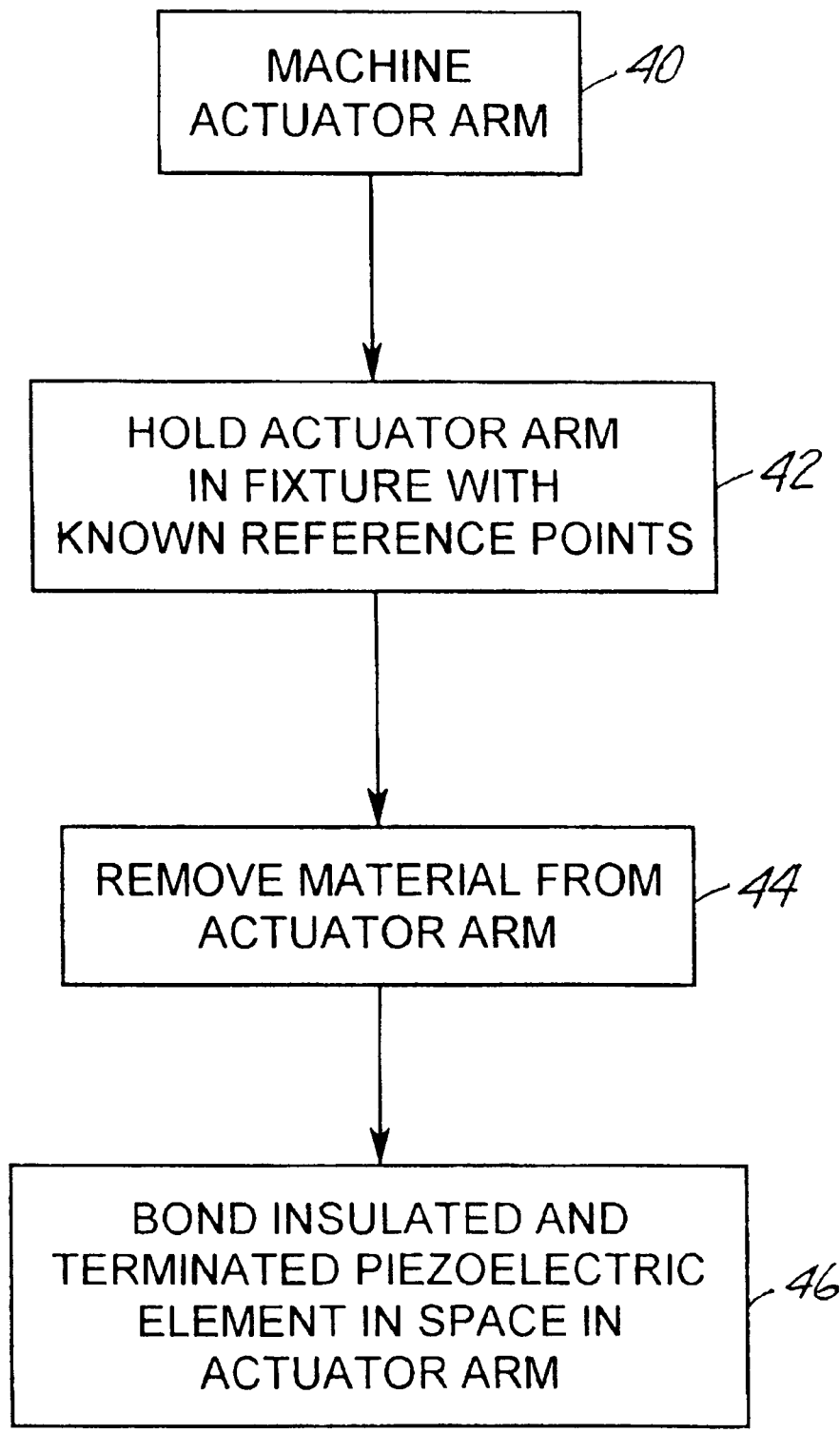
FIG. 5 is a flow diagram illustrating the process of embedding a piezoelectric element in the actuator arm according to the present invention.

FIG. 5 is a flow diagram illustrating the process steps for embedding a piezoelectric element into the actuator arm according to the present invention. First, at step 40, the actuator arm is formed such that space 19 creates arm side portions 21a and 21b, space 19 extending as close as possible to axis 14. At step 42, the actuator arm is placed in a fixture and aligned to known reference points. A predetermined section of material is then removed at step 44, from one or both of side portions 21a and 21b of the actuator arm at the end of space 19 closest to axis 14. Finally, at step 46, an insulated and terminated piezoelectric element is bonded in the section in the arm portion where material was removed. If only one side portion 21a or 21b is fitted with a piezoelectric element, it is preferred that step 44 additionally includes machining relief 28 (FIG. 1) into the other size portions.

By embedding the piezoelectric element in a conventional actuator arm, the present invention provides a microactuator without requiring additional design of the actuator arm, head suspension, head suspension mounting block, gimbal, or slider. These components are manufactured according to existing processes known in the art.

Figure 6:
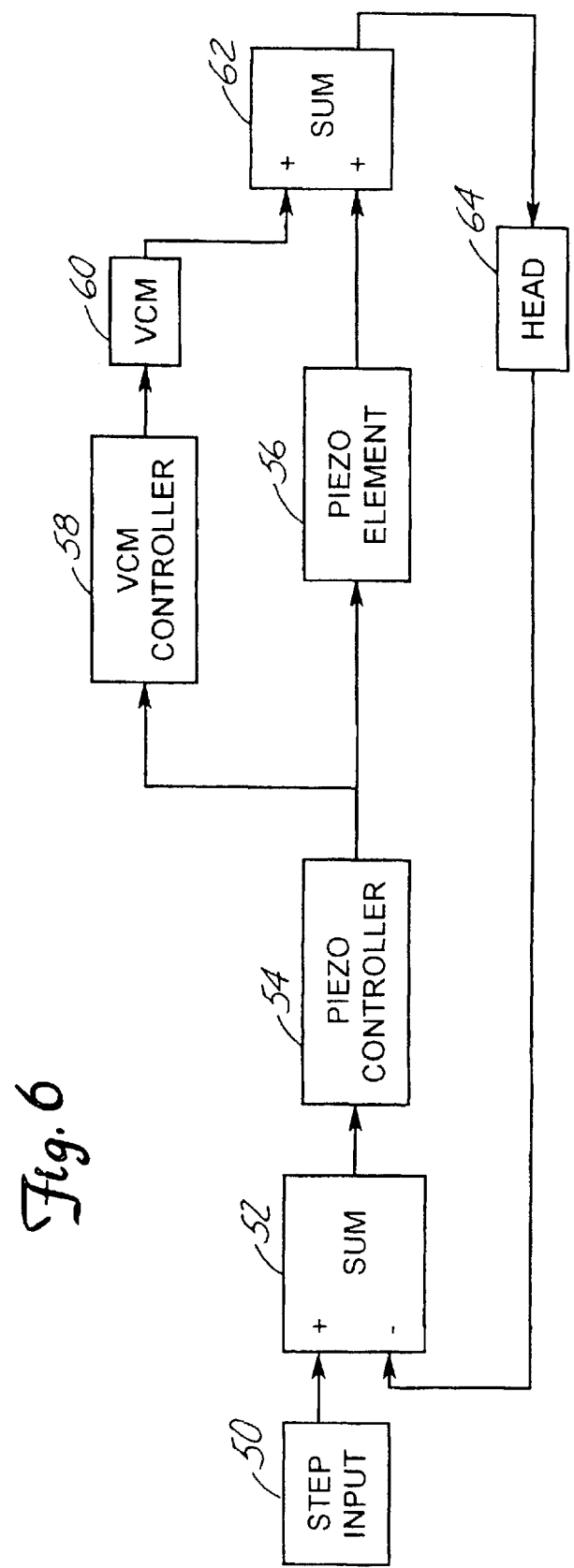
FIG. 6 is a block diagram illustrating the functional elements of a feedback servo controller circuit usable with the dual-stage actuation system of the present invention.

FIG. 6 is a logical block diagram of the functional elements of a dual-stage actuation control system of the present invention. The actuation control system includes a step input circuit 50, summing circuit 52, piezoelectric element controller 54, piezoelectric element 56, VCM controller 58, VCM 60, summing block 62, and head 64.

Step input 50 provides an electrical signal representative of the number of the destination track to which the head is to be moved. Summing circuit 52 subtracts the track number over which the head is currently positioned, as interpreted from the servo information read by head 64 from the disc, from the destination track number provided by step input 50. Thus, summing circuit 52 provides a signal indicative of the number of tracks that the head must traverse, and the direction in which the head must move. Piezoelectric element controller 54 analyzes the number of tracks which the head must traverse, and distributes the required movement among piezoelectric element 56 and VCM 60. Piezoelectric element controller 54 provides the necessary signals to control the movement of piezoelectric element 56 (that is, provides a voltage across the terminals of piezoelectric element 56), and VCM controller 58 provides the signals necessary to control the movement of VCM 60. Summing block 62 represents the total movement effected by VCM 60 and piezoelectric element 56, so that the output of summing block 62 represents the total physical movement of the head. Head 64 reads servo information from the disc, which is interpreted to determine the track over which the head is currently positioned. The current track number is subtracted by summing circuit 52 from the destination track number provided by step input circuit 50, and the functional loop is iterated again.

The dual-stage actuation control system of the present invention may be operated with a disc having a track recording density that is so high that VCM 60 only has sufficient resolution to move the head in increments of five tracks. For example, step input 50 may provide a signal indicating that the head is to move from track 100 to track number 208. Summing circuit 52 subtracts the current track number (100) from the desired track number (208) to determine that the head must move 108 tracks in the positive displacement direction. This information is provided to piezoelectric element controller 54. Piezoelectric element controller 54 may, for example, be configured with the capability of operating piezoelectric element 56 to move the head up to five tracks. Thus, when piezoelectric element controller 54 analyzes the desired movement of 108 tracks, it sends a signal to piezoelectric element 56 that causes piezoelectric element 56 to move the head its maximum radial displacement, five tracks. This movement is not enough to obtain the desired head movement (108 tracks), so piezoelectric element controller 54 distributes the remainder of the head movement to VCM 60. In this example, VCM controller 58 receives a signal from piezoelectric element controller 54 that indicates there are 103 tracks left to traverse. VCM controller 58 then operates VCM 60 to move the head 100 tracks. The total movement by VCM 60 and piezoelectric element 56, symbolized as being summed in block 62, is 105 tracks. Thus, the track number over which head 64 is currently positioned is 205.

This current track number (205) is subtracted from the destination track number (208) by summing circuit 52, yielding a desired track movement of three tracks in the positive displacement direction. However, piezoelectric element controller 54 has already operated piezoelectric element 56 to its maximum extent. Therefore, piezoelectric element controller 54 distributes the desired three-track movement by sending a signal to VCM controller 58 to operate VCM 60 to move the head one more increment (5 tracks), and operates piezoelectric element 56 to displace the head two tracks less than its maximum (3 tracks). Thus, the movement of head 64 effected by VCM 60 is 105 tracks, and the movement of head 64 effected by piezoelectric element 56 is three tracks. These movements are symbolically added in block 62, to yield a total movement of 108 tracks, and the head is positioned over track number 208, as determined from the servo information read by head 64. This current track, number (208) is subtracted from the destination track number (208) at summing circuit 52, yielding a desired track movement of zero tracks. The logical loop continues in this steady state until a new desired track number is input by step input circuit 50.

The actuation system is preferably also designed to compensate small off-track errors, such as one-quarter or other fractional track errors, for example. Thus, when head 64 detects an off-center condition, a correction signal is passed through summing circuit 52 to controller 54 to operate piezoelectric element 56. Piezoelectric element 56 has sufficient resolution to correct these off-track errors, to center the head over the desired track. When these small adjustments need to be made, piezoelectric controller 54 serves to distribute the head centering movement to piezoelectric element 56, so that VCM 60 is not operated for such minuscule movements.

Figure 7:
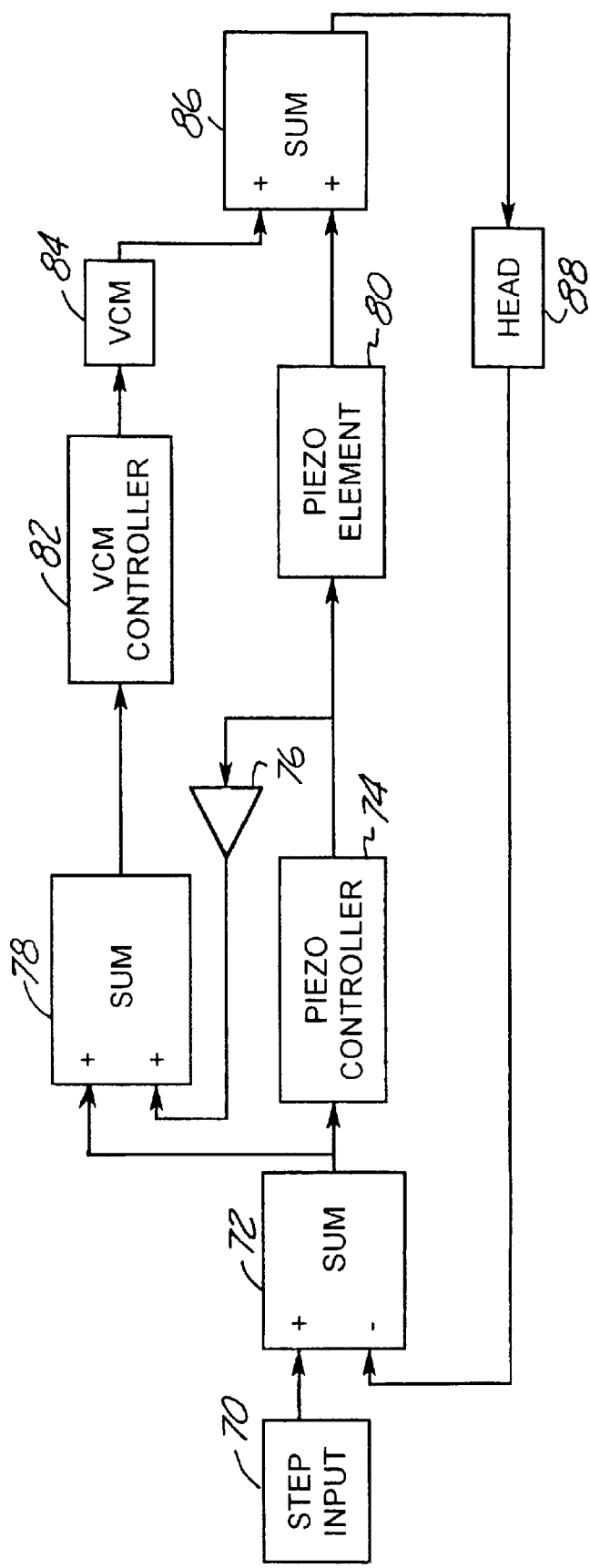
FIG. 7 is a logical block diagram of the functional elements of an alternative dual-stage actuation control system of the present invention.

FIG. 7 is a logical block diagram of the functional elements of an alternative dual-stage actuation control system of the present invention, including a step input circuit 70, summing circuit 72, piezoelectric element controller 74, unity gain inverter 76, summing circuit 78, piezoelectric element 80, VCM controller 82, VCM 84, summing block 86, and head 88.

Step input 70 provides an electrical signal representative of the number of the destination tracks to which the head is to be moved. Summing circuit 72 subtracts the track number over which the head is currently positioned, as interpreted from the servo information read by head 88 from the disc, from the destination track number provided by step input 70. Thus, summing circuit 72 provides a signal indicative of the number of tracks that the head must traverse, and the direction in which the head must move. Piezoelectric element controller 74 analyzes the number of tracks which the head must traverse, and provides a signal to control the movement of piezoelectric element 80 (that is, provides a voltage across the terminals of piezoelectric element 80) based on the required track movement received from summing circuit 72. The signal provided from piezoelectric element controller 74 is inverted by inverter 76, and summing circuit 78 adds the required track movement from summing circuit 72 and the inverted movement achieved by piezoelectric element 80 under the control of piezoelectric element controller 74, yielding a signal representing the required track movement remaining. VCM controller 82 analyzes the number of tracks left for the head to traverse, and provides signals to control the movement of VCM 84 to achieve that motion. Summing block 86 represents the total movement effected by VCM 84 and piezoelectric element 80, so that the output of summing block 86 represents the total physical movement of the head. Head 88 reads servo information from the disc, which is interpreted to determine the track over which the head is currently positioned. The current track number is subtracted by summing circuit 72 from the destination track number provided by step input circuit 70, and the functional loop is iterated again.

The dual-stage actuation control system shown in FIG. 7 operates in a manner substantially similar to the actuation control system shown in FIG. 6 and described previously.

The control system shown in FIG. 7 contains slightly more components than the system shown in FIG. 6, but also requires a less complex piezoelectric element controller. It will be apparent to those skilled in the art that the control systems shown in FIGS. 6 and 7 effectively operate a low resolution motor to effect coarse positioning of a head, and also operate a high-resolution piezoelectric microactuator to effect fine positioning of the head, while preventing application of a voltage to the high resolution piezoelectric microactuator that exceeds the range of allowable voltages, which would saturate the microactuator and inhibit the performance of the system.

The dual-stage actuation system of the present invention efficiently controls the positioning of a head over a selected track of a rotatable disc. A piezoelectric microactuator is integrated into the actuator arm of the system, providing high resolution head positioning without requiring additional design of existing disc drive components. The piezoelectric microactuator is located in the actuator arm to maximize the attainable range of head movement and to minimize head skew.

Although the present invention has been described with reference to preferred embodiments, workers skilled in the art will recognize that changes may be made in form and detail without departing from the spirit and scope of the invention.

What is claimed is:

1. A system for positioning a transducing head of a disc drive over a selected track of a rotatable disc having a plurality of concentric tracks, the system including an actuator arm movable about an axis, a head suspension mechanism connected to an end of the actuator arm, and a slider supporting the transducing head, the slider being mounted to the head suspension mechanism. the system comprising:

a low resolution motor operatively coupled to the actuator arm to move the actuator arm about the axis to effect coarse positioning of the head with respect to the selected track of the rotatable disc;

a piezoelectric element in the actuator arm to distort the arm to effect fine positioning of the head with respect to the selected track of the rotatable disc, the piezoelectric element having a size based on a voltage across the piezoelectric element; and control circuitry for distributing a desired movement of the head between the low resolution motor and the piezoelectric element, comprising:

an input circuit providing a selected track number corresponding to the selected track; and a feedback loop comprising:

means associated with the head for identifying a current track number corresponding to a track currently confronting the head;

a summing circuit comparing the selected track number and the current track number to identify a required movement of the head from the current track to the selected track;

a piezoelectric element controller for operating the piezoelectric element to effect fine movement of the head and distributing control signals representative of a number of tracks remaining to be traversed; and a low resolution motor controller receiving the control signals from the piezoelectric element controller and operating the low resolution motor in response to the control signals to effect coarse movement of the head.

2. The system of claim 1, wherein the piezoelectric element controller operates the piezoelectric element to effect fine positioning of the head up to a predetermined maximum range of the piezoelectric element and transmits control signals representative of the number of tracks remaining to be traversed to the low resolution motor controller in a first iteration of the feedback loop, and if the head is not yet positioned over the selected track, the piezoelectric element controller operates the piezoelectric element to effect fine positioning of the head to an extent less than the maximum range of the piezoelectric element and transmits control signals representative of an incremental number of tracks remaining to be traversed to the low resolution motor controller in a second iteration of the feedback loop.

3. The system of claim 1, wherein the actuator arm includes a space on a longitudinal axis of the actuator arm forming first and second arm side portions on opposite sides of the longitudinal axis, and the piezoelectric element is in the first side portion of the actuator arm.

4. The system of claim 3, including a relief in the second side portion of the actuator arm.

5. The system of claim 3, further comprising an additional piezoelectric element in the second side portion configured complementary to the piezoelectric element in the first side portion.

6. The system of claim 1, wherein the piezoelectric element includes first and second opposite terminals adjoining the actuator arm.

7. The system of claim 1, wherein the piezoelectric element in the actuator arm is located near the axis.

8. A system for positioning a transducing head of a disc drive over a selected track of a rotatable disc having a plurality of concentric tracks, the system including an actuator arm movable about an axis, a head suspension mechanism connected to an end of the actuator arm, and a slider supporting the transducing head, the slider being mounted to the head suspension mechanism, the system comprising:

a low resolution motor operatively coupled to the actuator arm to move the actuator arm about the axis to effect coarse positioning of the head with respect to the selected track of the rotatable disc;

a piezoelectric element in the actuator arm to distort the arm to effect fine positioning of the head with respect to the selected track of the rotatable disc, the piezoelectric element having a size based on a voltage across the piezoelectric element; and control circuitry for distributing a desired movement of the head between the low resolution motor and the piezoelectric element, comprising:

an input circuit providing a selected track number corresponding to the selected track; and a feedback loop comprising:

means associated with the head for identifying a current track number corresponding to a track currently confronting the head;

a first summing circuit comparing the selected track number and the current track number to identify a required movement of the head from the current track to the selected track;

a piezoelectric element controller for generating a signal to operate the piezoelectric element to effect fine movement of the head;

a second summing circuit comparing the required movement of the head and the signal generated to effect fine movement of the head by the piezoelectric element controller to identify a remaining required movement of the head; and a low resolution motor controller for operating the low resolution motor based on the remaining required movement of the head to effect coarse movement of the head.

9. The system of claim 8, wherein the actuator arm includes a space on a longitudinal axis of the actuator arm forming first and second arm side portions on opposite sides of the longitudinal axis, and the piezoelectric element is in the first side portion of the actuator arm.

10. The system of claim 9, further comprising a relief in the second side portion of the actuator arm.

11. The system of claim 9, further comprising an additional piezoelectric element in the second side portion configured complementary to the piezoelectric element in the first side portion.

12. The system of claim 8, wherein the piezoelectric element includes first and second opposite terminals adjoining the actuator arm.

13. The system of claim 8, wherein the piezoelectric element in the actuator arm is located near the axis.

14. In a positioning system for positioning a transducing head over a selected track of a rotatable disc in a disc drive device, the rotatable disc having a plurality of concentric tracks radially positioned about a disc axis, the system including an actuator arm movable about an actuator arm axis, a head suspension mechanism connected to an end of the actuator arm, a slider connected to the head suspension mechanism and supporting the transducing head, and a low resolution motor operatively coupled to the actuator arm to move the actuator arm about the actuator arm axis to radially position the head relative to the disc axis over or near the selected track of the rotatable disc, the improvement comprising:

a piezoelectric element in the actuator arm operable to selectively distort the actuator arm to selectively adjust the radial position of the head relative to the selected track, the piezoelectric element having a size based on a voltage applied to the piezoelectric element; and control circuitry providing first electrical signals to the low resolution motor to coarsely position the head over or near the selected track and second electrical signals to the piezoelectric element to control the size of the piezoelectric element to distort the actuator arm to position the head over the selected track the control circuitry being responsive to position signals from the head representative of a current position of the head and an input signal representative of a desired position of the head to selectively provide the first and second electrical signals, the control circuitry comprising:

an input circuit providing a selected track number corresponding to the selected track; and feedback loop comprising:

means associated with the head for identifying a current track number corresponding to a track currently confronting the head;

a summing circuit comparing the selected track number and the current track number to identify a required movement of the head from the current track to the selected track;

a piezoelectric element controller for operating the piezoelectric element to effect fine movement of the head and distributing control signals representative of a number of tracks remaining to be traversed; and a low resolution motor controller receiving the control signals from the piezoelectric element controller and operating the low resolution motor in response to the control signals to effect coarse movement of the head.

15. The system of claim 14, wherein the piezoelectric element controller operates the piezoelectric element to effect fine positioning of the head up to a predetermined maximum range of the piezoelectric element and transmits control signals representative of the number of tracks remaining to be traversed to the low resolution motor controller in a first iteration of the feedback loop, and if the head is not yet positioned over the selected track, the piezoelectric element controller operates the piezoelectric element to effect fine positioning of the head to an extent less than the maximum range of the piezoelectric element and transmits control signals representative of an incremental number of tracks remaining to be traversed to the low resolution motor controller in a second iteration of the feedback loop.

16. In a positioning system for positioning a transducing head over a selected track of a rotatable disc in a disc drive device, the rotatable disc having a plurality of concentric tracks radially positioned about a disc axis, the system including an actuator arm movable about an actuator arm axis, a head suspension mechanism connected to an end of the actuator arm, a slider connected to the head suspension mechanism and supporting the transducing head, and a low resolution motor operatively coupled to the actuator arm to move the actuator arm about the actuator arm axis to radially position the head relative to the disc axis over or near the selected track of the rotatable disc, the improvement comprising:

a piezoelectric element in the actuator arm operable to selectively distort the actuator arm to selectively adjust the radial position of the head relative to the selected track, the piezoelectric element having a size based on a voltage applied to the piezoelectric element; and control circuitry providing first electrical signals to the low resolution motor to coarsely position the head over or near the selected track and second electrical signals to the piezoelectric element to control the size of the piezoelectric element to distort the actuator arm to position the head over the selected track, the control circuitry being responsive to position signals from the head representative of a current position of the head and an input signal representative of a desired position of the head to selectively provide the first and second electrical signals, the control circuitry comprising:

an input circuit providing a selected track number corresponding to the selected track; and a feedback loop comprising:

means associated with the head for identifying a current track number corresponding to a track currently confronting the head;

a first summing circuit comparing the selected track number and the current track number to identify a required movement of the head from the current track to the selected track;

a piezoelectric element controller for generating a signal to operate the piezoelectric element to effect fine movement of the head;

a second summing circuit comparing the required movement of the head and the signal generated to effect fine movement of the head by the piezoelectric element controller to identify a remaining required movement of the head; and a low resolution motor controller for operating the low resolution motor based on the remaining required movement of the head to effect coarse movement of the head.

* * * * *